US012783949B2

(12) United States Patent
Lee et al.

(10) Patent No.: US 12,783,949 B2
(45) Date of Patent: Nov. 3, 2026

(54) ADAPTIVELY TRAINING A MACHINE LEARNING MODEL FOR ESTIMATING ENERGY CONSUMPTION IN A CLOUD COMPUTING SYSTEM

(71) Applicant: International Business Machines Corporation, Armonk, NY (US)

(72) Inventors: Eun Kyung Lee, Bedford Corners, NY (US); Sunyanan Choochotkaew, Tokyo (JP); Huamin Chen, Newton, MA (US); Kaiyi Liu, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 18/324,340

(22) Filed: May 26, 2023

(65) Prior Publication Data

US 2024/0394590 A1 Nov. 28, 2024

(51) Int. Cl.

*G06N 20/00* (2019.01)
*G06F 1/26* (2006.01)

(52) U.S. Cl.

CPC ............... *G06N 20/00* (2019.01); *G06F 1/26* (2013.01)

(58) Field of Classification Search

CPC .................................. G06N 20/00; G06F 1/26
See application file for complete search history.

(56) References Cited

U.S. PATENT DOCUMENTS

| | | | | |
|---|---|---|---|---|
| 10,452,994 | B2 | 10/2019 | Duesterwald et al. | |
| 11,537,439 | B1 | 12/2022 | Liberty et al. | |
| 11,568,081 | B2 | 1/2023 | Mukhopadhyay et al. | |
| 2007/0220034 | A1 | 9/2007 | Iyer et al. | |
| 2013/0282337 | A1* | 10/2013 | Fujiwaka | G06F 11/3414 702/186 |
| 2019/0004579 | A1* | 1/2019 | Allen-Ware | G06F 1/3228 |
| 2021/0073627 | A1 | 3/2021 | Sarferaz | |
| 2022/0092480 | A1 | 3/2022 | Mahadik | |
| 2022/0285938 | A1 | 9/2022 | Mehta et al. | |
| 2023/0418688 | A1* | 12/2023 | Wang | G06F 9/5094 |
| 2025/0199855 | A1* | 6/2025 | Okamura | H02J 3/00 |

FOREIGN PATENT DOCUMENTS

AU 2018373029 B2 8/2021

OTHER PUBLICATIONS

Vasic, DejaVu: Accelerating Resource Allocation in Virtualized Environments, pp. 1-13 (Year: 2012).*

(Continued)

*Primary Examiner* — Albert M Phillips, III
(74) *Attorney, Agent, or Firm* — CANTOR COLBURN LLP; Rakesh Roy

(57) ABSTRACT

Computer-implemented methods for adaptively training a machine learning model for estimating energy consumption in a cloud computing system are provided. Aspects include detecting an update event in the cloud computing system and collecting energy consumption data for the cloud computing system for a time period after the occurrence of the update event. Aspects also include retraining a power consumption model based at least in part on the data collected during the time period and storing the power consumption model in the cloud computing system.

17 Claims, 6 Drawing Sheets

(56) References Cited

OTHER PUBLICATIONS

Yatu, Retraining an existing machine learning model with new data, pp. 1-3 (Year: 2022).*
Wu, Sampling Strategy Analysis of Machine Learning Models for Energy Consumption Prediction, pp. 77-81 (Year: 2021).*
Helmbrecht, Using the IBM Block Storage CSI Driver in a Red Hat OpenShift Environment, pp. 1-139. May (Year: 2021).*

* cited by examiner

ADAPTIVELY TRAINING A MACHINE LEARNING MODEL FOR ESTIMATING ENERGY CONSUMPTION IN A CLOUD COMPUTING SYSTEM

BACKGROUND

The present disclosure generally relates to Cloud computing, and more specifically, to adaptively training a machine learning model for estimating energy consumption in a cloud computing system.

Recently, there has been increased interest in obtaining an accurate estimate of the energy consumption of a workload in a Cloud computing system. One factor driving this interest is regulations requiring the disclosure of a Carbon footprint for companies. In order to determine the Carbon footprint of the exaction of a workload in a Cloud computing system, the energy consumption of a workload in a Cloud computing system must first be determined.

SUMMARY

Embodiments of the present disclosure are directed to computer-implemented methods for adaptively training a machine learning model for estimating energy consumption in a cloud computing system. According to an aspect, a computer-implemented method includes detecting an update event in the cloud computing system and collecting energy consumption data for the cloud computing system for a time period after the occurrence of the update event. The method also includes retraining a power consumption model based at least in part on the data collected during the time period and storing the power consumption model in the cloud computing system.

Embodiments also include computing systems and computer program products for estimating workload energy consumption in a Cloud computing system.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
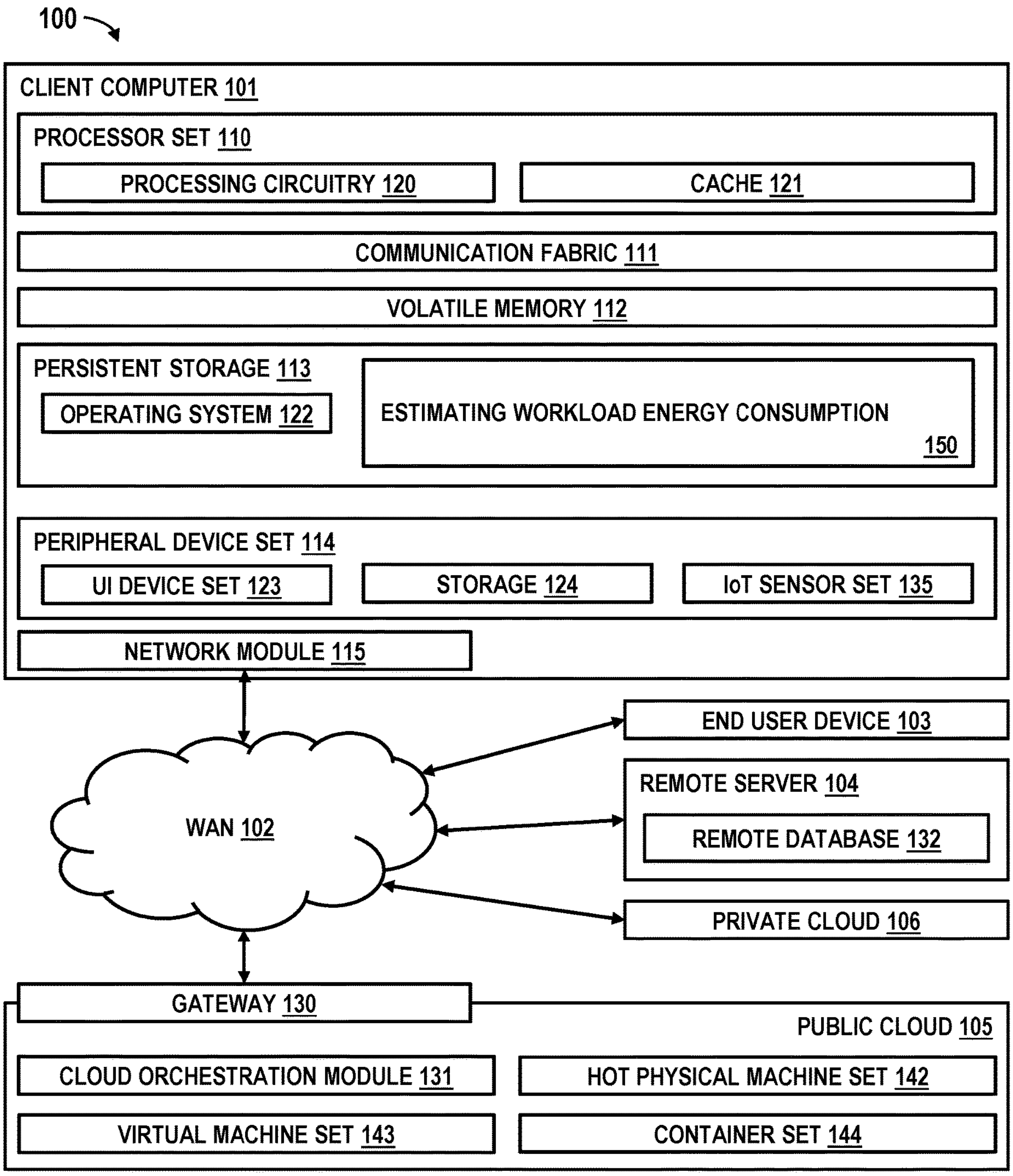
FIG. 1 depicts a block diagram of an example computer system for use in conjunction with one or more embodiments of the present disclosure.

Traditional methods for calculating the energy consumption of a workload in a cloud computing environment are designed for fixed workload patterns and the accuracy of these models decreases as workload patterns change. In most cases, workloads executing in cloud computing environments are volatile, i.e., the processing demands of the workload fluctuate. For example, for transient workloads, a kernel scheduler can adjust a CPU frequency, and thus the power consumption model changes. Likewise, overtime workloads may use different sets of CPU instructions, which have different power consumption characteristics.

Recently, machine learning techniques have been used to estimate workload energy consumption in a cloud computing environment by creating a power consumption model. These machine learning techniques constantly monitor energy consumption levels and workload execution in the cloud computing environment and constantly update and retrain the power consumption model to adapt to changing workload patterns. The constant collection of energy consumption levels and workload execution metrics and retraining of the power consumption model consumes a lot of computing resources and can have a negative impact on the performance of the cloud computing environment.

In exemplary embodiments, systems and methods for adaptively training a machine learning model for estimating energy consumption in a cloud computing system are provided. In exemplary embodiments, once a power consumption model is created for a cloud computing system, the power consumption model is only retrained, or updated, based on a determination that an update event has occurred in the cloud computing system. The update event can be a change of hardware device in the cloud computing system, a change in software in the cloud computing system, or a signification change in the characteristics of a workload executing in the cloud computing system. Once an update event is indicated or detected, metrics regarding the energy consumption levels and workload execution in the cloud computing environment are obtained, transmitted, and used to retrain the power consumption model. By only retraining the power consumption model upon the determination that an update event has occurred, the use of computing resources, such as processing power used to train the power consumption model and bandwidth used to transmit the metrics regarding the energy consumption levels and workload execution, can be reduced.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as estimating the energy consumption of a workload in a Cloud computing 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IOT) sensor set 125), and network module 115. Remote server 104 includes remote database 132. Public Cloud 105 includes gateway 130, Cloud orchestration module 131, host physical machine set 132, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 132, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
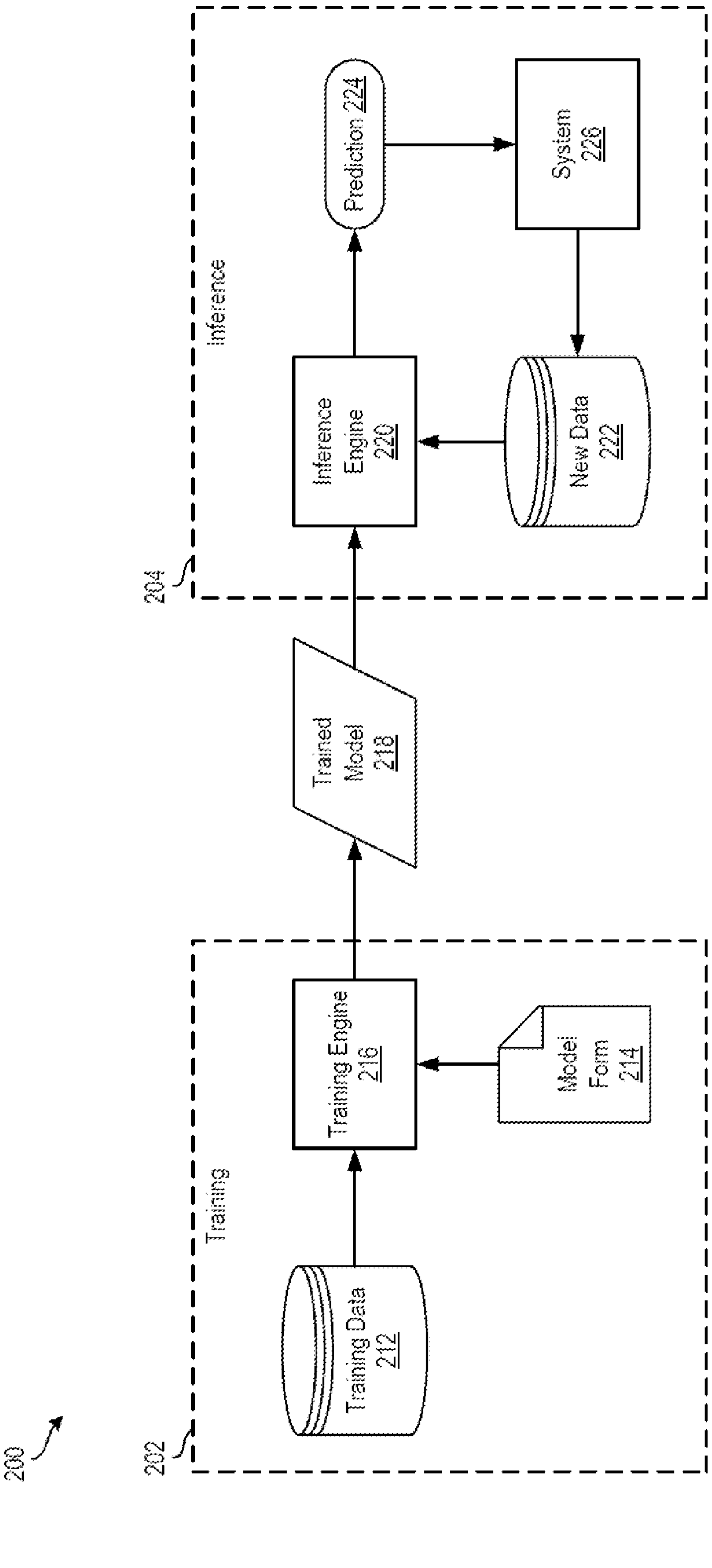
FIG. 2 depicts a block diagram of components of a machine learning training and inference system in accordance with one or more embodiments of the present disclosure.

Systems for training and using a machine learning model are now described in more detail with reference to FIG. 2. Particularly, FIG. 2 depicts a block diagram of components of a machine learning training and inference system 200 according to one or more embodiments described herein. The system 200 performs training 202 and inference 204. During training 202, a training engine 216 trains a model (e.g., the trained model 218) to perform a task, such as estimating a power consumption of a workload executing on a Cloud computing environment. Inference 204 is the process of implementing the trained model 218 to perform the task, such as estimating a power consumption of a workload executing on a Cloud computing environment, in the context of a larger system (e.g., a system 226). All or a portion of the system 200 shown in FIG. 2 can be implemented, for example by all or a subset of the computing environment 100 of FIG. 1.

The training 202 begins with training data 212, which may be structured or unstructured data. According to one or more embodiments described herein, the training data 212 includes power consumption data of workloads executing on in various different Cloud computing environments. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 may be a model form of a CNN. The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 may be performed multiple times (referred to as "epochs") until a suitable model is trained (e.g., the trained model 218).

Once trained, the trained model 218 can be used to perform inference 204 to perform a task, such as estimating a power consumption of a workload executing on a Cloud computing environment. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments, the system 226 can add to and/or modify the new data 222 based on the prediction 224.

In accordance with one or more embodiments, the predictions 224 generated by the inference engine 220 are periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

Figure 3:
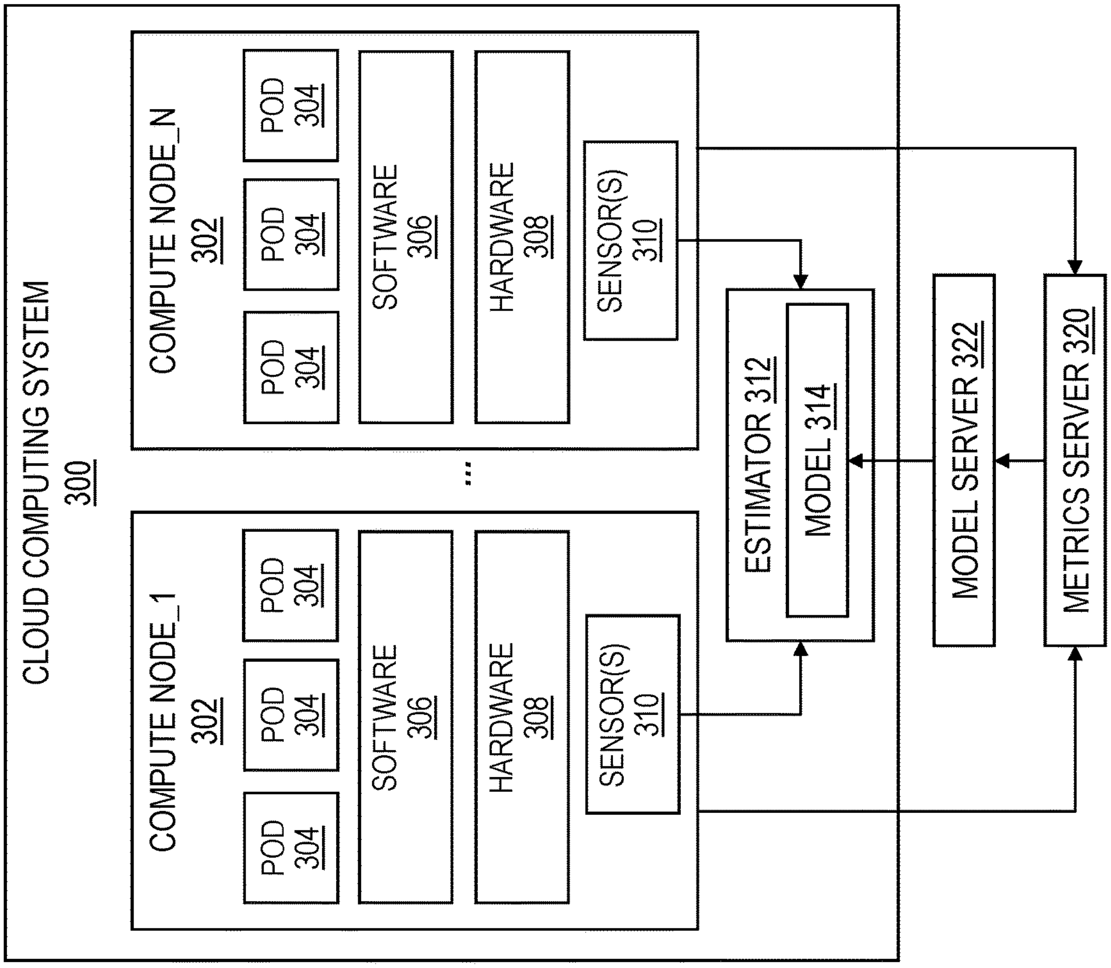
FIG. 3 depicts a block diagram of a system for estimating the energy consumption of a workload in a Cloud computing system in accordance with one or more embodiments of the present disclosure.

Referring now to FIG. 3, a Cloud computing system 300 for estimating workload energy consumption in a Cloud computing system in accordance with one or more embodiments of the present disclosure is shown. As illustrated, the Cloud computing system 300 includes a plurality of compute nodes 302 that each includes a plurality of pods 304. In exemplary embodiments, each pod 304 represents a set of running containers that are configured to support a workload. Each compute node 302 also includes software 306 and hardware 308 that are used to execute the workload on the compute node 302. In exemplary embodiments, the hardware 308 includes one or more processors, a memory, and one or more Peripheral Component Interconnect (PCI) devices. The software 306 includes a Cloud platform (such as Amazon Webservices (AWS), AZURA, IBM Cloud, or the like), a container management system (such as Kubernetes or OpenShift), an operating system, and an identification of a virtualization technology (such as KVM, Hyper-V, VMWARE) being used in the compute node 302.

In exemplary embodiments, each compute node 302 also includes one or more sensors 310 that are configured to monitor each pod 304, the software 306 and the hardware 308. The sensors 310 periodically collect the activity level and corresponding energy usage level for each pod 304 the software 306 and the hardware 308. In exemplary embodiments, the frequency of collection of the activity level and corresponding energy usage level for each pod 304, the software 306, and the hardware 308 is set by an administrator of the Cloud computing system 300. In one embodiment, each sample collected by the sensors 310 includes a workload identifier, a pod identifier, metadata regarding the software 306 and the hardware 308 and a current energy usage level for the portion of the identified workload being executed on the identified pod. The current energy usage may be expressed in kW/h for each workload ID and POD ID. The sensors 310 are configured to transmit the collected activity level and energy usage level for each pod 304, the software 306, and the hardware 308 to both an estimator 312 and to a metrics server 320.

In exemplary embodiments, the frequency of the collection of the data by the sensors 310 and the transmission of the data to the metrics server 320 is based on a state of the compute node 302. In exemplary embodiments, the state of the compute node 302 is one of a steady state and an updated state. In exemplary embodiments, the compute node 302 operates in a steady state until the occurrence of an update event on the compute node 302. After the occurrence of an update event on the compute node 302, the compute node 302 operates in an updated state for a period of time. In exemplary embodiments, the duration of the period of time is based at least in part on the type of the update event.

In various embodiments, the metrics server 320 and the model server 322 may be part of the Cloud computing system 300 or may be separate from the Cloud computing system 300, as illustrated. In one embodiment, the model server 322 is a machine learning training and inference system, such as the one shown in FIG. 2. The model server 322 is configured to obtain the collected activity level and energy usage level for each pod 304, the software 306, and the hardware 308 from the metrics server 320. Based on this received data, the model server 322 is configured to create a power consumption model 314 for the Cloud computing system 300 and to transmit the power consumption model 314 to the estimator 312. In various embodiments, the estimator 312 may be part of the Cloud computing system 300, as illustrated, or may be separate from the Cloud computing system 300. The estimator 312 is configured to obtain the power consumption model 314 from the model server 322 and to utilize the data received from the sensors 310 to calculate the estimated power consumption of a workload executing on the Cloud computing system 300. In exemplary embodiments, the model server 322 creates the power consumption model 314 and periodically updates the power consumption model 314 by retraining the power consumption model 314 using newly received data from the metrics server 320.

Figure 4:
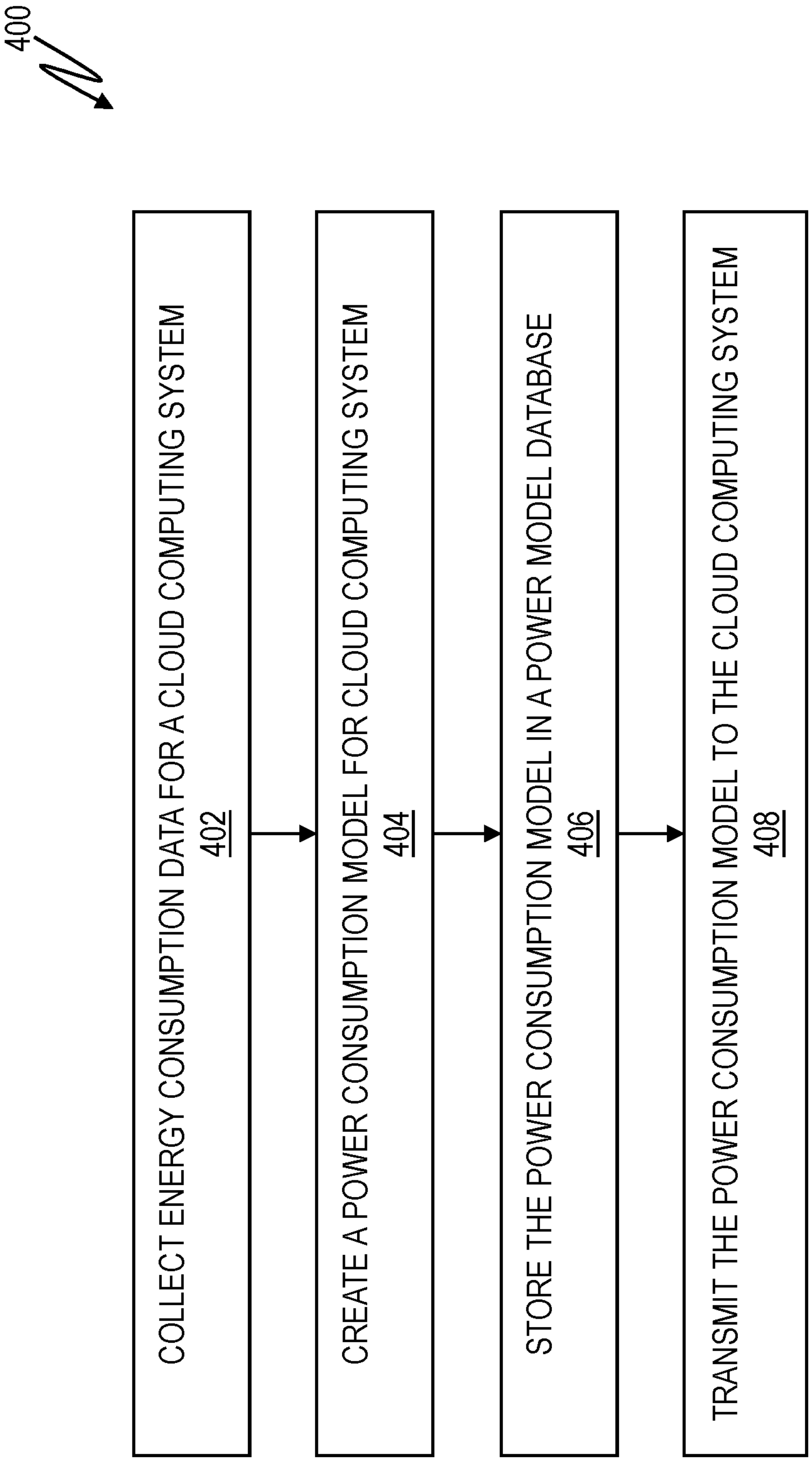
FIG. 4 depicts a flowchart of a method for creating a machine learning model for estimating energy consumption in a cloud computing system in accordance with one or more embodiments of the present disclosure.

Referring now to FIG. 4, a flowchart of a method 400 for creating a machine learning model for estimating energy consumption in a cloud computing system in accordance with one or more embodiments of the present disclosure is shown. As used herein the term Cloud computing system refers to any Cloud computing system and may include a public Cloud, a private could, and a combination of the two. As shown at block 402, the method 400 includes collecting energy consumption data for a Cloud computing system. In exemplary embodiments, each Cloud computing system is defined by a set of metadata that specifies the hardware and software used in the Cloud computing system configuration. Next, as shown at block 404, the method 400 includes creating a power consumption model for the Cloud computing system. In exemplary embodiments, the power consumption model for the Cloud computing system configurations is created using one or more machine learning models. The method 400 also includes storing the power consumption model in a power model database, as shown at block 406. The method 400 concludes at block 408 by transmitting the power consumption model to the cloud computing system.

Figure 5:
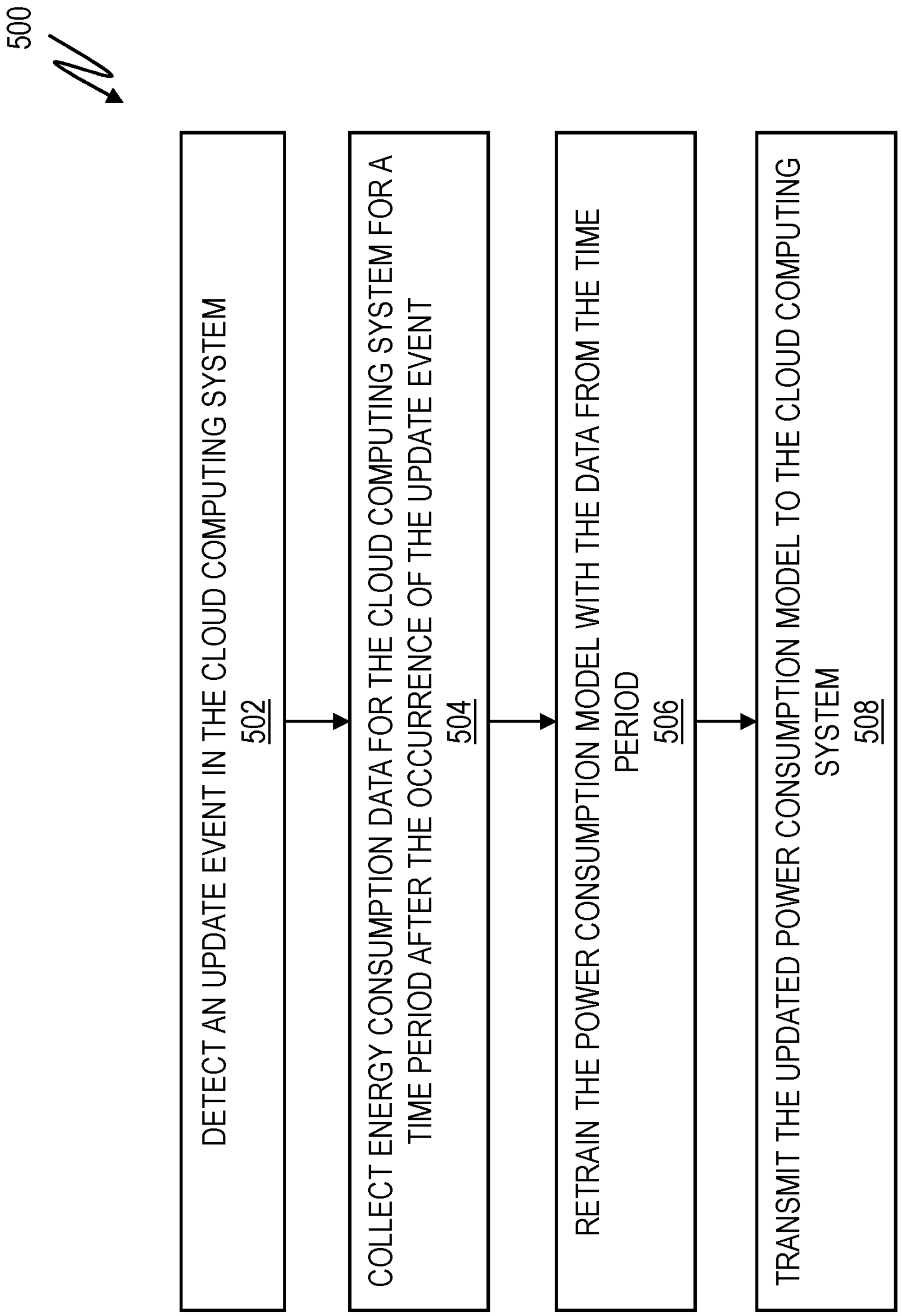
FIG. 5 depicts a flowchart of a method for adaptively training a machine learning model for estimating energy consumption in a cloud computing system in accordance with one or more embodiments of the present disclosure.

Referring now to FIG. 5, a flowchart of a method 500 for adaptively training a machine learning model for estimating energy consumption in a cloud computing system in accordance with one or more embodiments of the present disclosure is shown. As used herein the term Cloud computing system refers to any Cloud computing system and may include a public Cloud, a private could, and a combination of the two. As shown at block 502, the method 500 includes detecting an update event in the cloud computing system. In exemplary embodiments, an update event can either be indicated by a user or detected by the Cloud computing system. The update events can include, but are not limited to, a change of one or more of a hardware device and a software within the cloud computing system. In addition, the update events can include a deviation of observed energy consumption data from an expected energy consumption data and/or a deviation of observed workload activity from an expected workload activity.

Continuing with reference to FIG. 5, the method 500 also includes collecting energy consumption data for the cloud computing system for a time period after the occurrence of the update event. In exemplary embodiments, a duration of the time period is based at least in part on a type of the update event. For example, the duration of the time period associated with an update event of a hardware change may be different than the duration of the time period associated with an update event of a software change.

In exemplary embodiments, the energy consumption data for the cloud computing system is continually collected at sampling rates that depend on the state of the cloud computing system. For example, when the cloud computing system is operating in a steady state (i.e., outside of the time period following an update event) the energy consumption data for the cloud computing system is collected at a second sampling rate and during the time period (i.e., during an update state) the energy consumption data for the cloud computing system is collected at first sampling rate, which is greater than the second sampling rate. In exemplary embodiments, the first sampling rate is at least twice the second sampling rate. In exemplary embodiments, the collected energy consumption data during the steady state is analyzed to identify a deviation of observed energy consumption data from an expected energy consumption data. In exemplary embodiments, a threshold deviation of the of observed energy consumption data from an expected energy consumption data required to trigger an update event may be set by a user.

In exemplary embodiments, metrics for an activity of a workload executing in the cloud computing system are continually collected at sampling rates that depend on the state of the cloud computing system. For example, when the cloud computing system is operating in a steady state (i.e., outside of the time period following an update event) the metrics for the activity of the workload are collected at a second sampling rate and during the time period (i.e., during an updated state) the metrics for the activity of the workload are collected at a first sampling rate, which is greater than the second sampling rate. In exemplary embodiments, the first sampling rate is at least twice the second sampling rate. In exemplary embodiments, the collected metrics for the activity of the workload during the steady state are analyzed to identify a deviation of observed workload activity from an expected workload activity. In exemplary embodiments, a threshold deviation of observed workload activity from an expected workload activity required to trigger an update event may be set by a user.

Next, as shown at block 506, the method 500 includes retraining the power consumption model with the data from the time period. In exemplary embodiments, the power consumption model is retrained using both the previously captured energy consumption data and the newly energy consumption data. In one embodiment, the newly captured energy consumption data is more heavily waited than the previously captured energy consumption data. The method 500 concludes at block 508 by transmitting the updated power consumption model to the cloud computing system.

Figure 6:
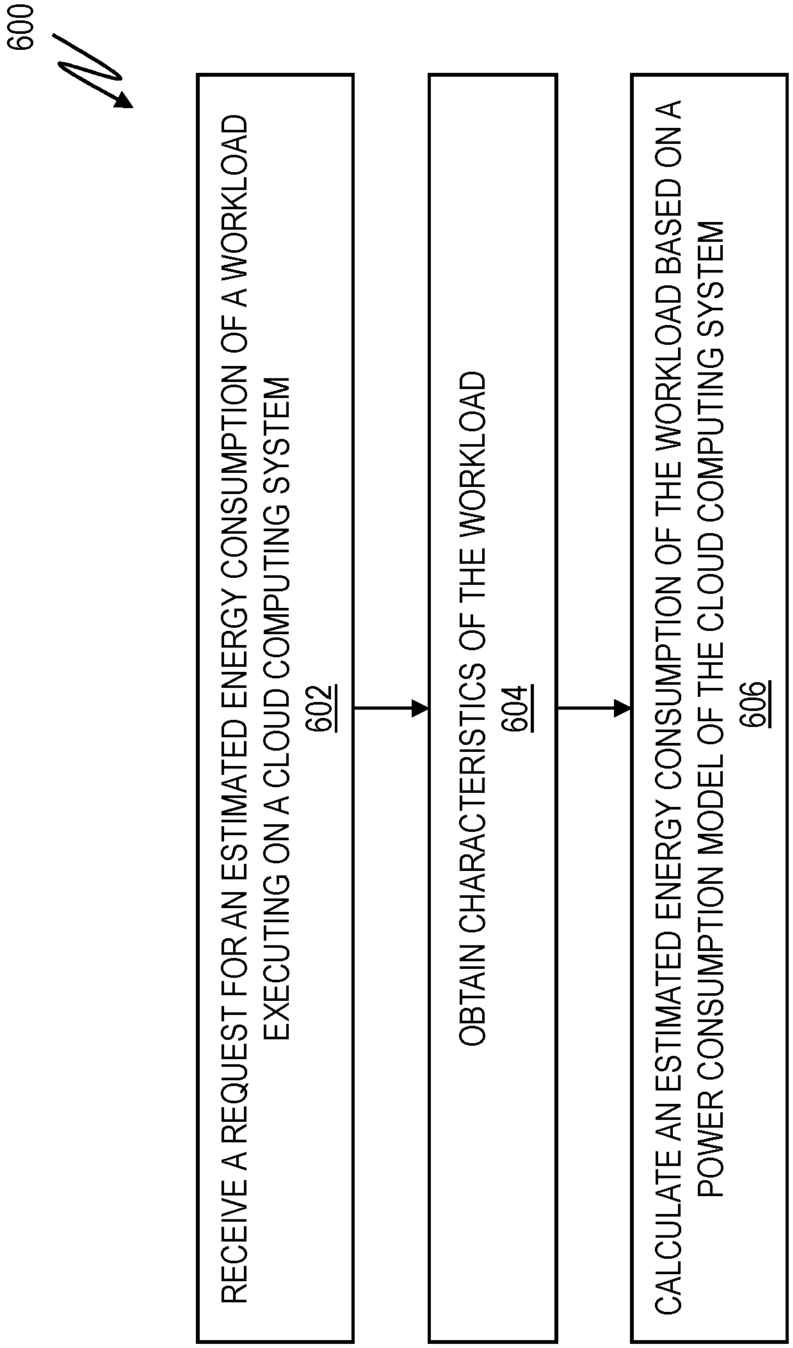
FIG. 6 depicts a flowchart of a method for estimating the energy consumption of a workload in a Cloud computing system in accordance with one or more embodiments of the present disclosure.

FIG. 6 depicts a flowchart of a method 600 for estimating the energy consumption of a workload in a Cloud computing system in accordance with one or more embodiments of the present disclosure. As used herein the term Cloud computing system refers to any Cloud computing system and may include a public Cloud, a private could, and a combination of the two. As shown at block 602, the method 600 includes receiving a request for an estimated energy consumption of a workload executing on a cloud computing system. In exemplary embodiments, the request includes an identification of the workload and a desired time period for the estimated energy consumption. Next, as shown at block 604, the method 600 includes obtaining characteristics of the workload. In exemplary embodiments, the characteristics of the workload include an identification of hardware, software and other services of the Cloud computing system that are being used by the workload. The method 600 also includes calculating the estimated energy consumption of the workload based on the power consumption model, as shown at block 606. In exemplary embodiments, the estimated energy consumption of the workload is calculated based by applying a monitored activity of the workload on the Cloud computing system to the power consumption model. In exemplary embodiments, one or more parameters of the power consumption model are adjusted based on the monitored activity of the workload.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for adaptively training a machine learning model for estimating energy consumption in a cloud computing system, comprising:

detecting an update event in the cloud computing system;

collecting, by one or more sensors, energy consumption data for the cloud computing system for a time period after an occurrence of the update event, wherein each sample collected by the one or more sensors includes a workload identifier, a pod identifier, metadata regarding software and hardware, and a current energy usage level for a portion of an identified workload being executed on an identified pod;

retraining a power consumption model with the data from the time period;

storing the power consumption model in the cloud computing system;

receiving a request for an estimated energy consumption of a workload executing on the cloud computing system, wherein the request includes an identification of the workload and a desired time period for the estimated energy consumption;

obtaining characteristics of the workload, wherein the characteristics of the workload include an identification of hardware, software and other services of the cloud computing system that are being used by the workload; and calculating an estimated energy consumption of the workload based on the characteristics of the workload and the power consumption model of the cloud computing system.

2. The method of claim 1, wherein the update event includes a change of one or more of a hardware device and a software within the cloud computing system.

3. The method of claim 1, wherein the update event includes a deviation of observed energy consumption data from an expected energy consumption data.

4. The method of claim 1, wherein the update event includes a deviation of observed workload activity from an expected workload activity.

5. The method of claim 1, wherein the energy consumption data for the cloud computing system is collected at a first sampling rate during the time period after an occurrence of the update event, wherein the update event includes a deviation of observed energy consumption data from an expected energy consumption data and/or a deviation of observed workload activity from an expected workload activity, and at a second sampling rate, which is less than the first sampling rate, outside of the time period, wherein the first sampling rate is at least twice the second sampling rate.

6. The method of claim 1, wherein metrics for an activity of a workload executing in the cloud computing system are collected at first sampling rate during the time period and at a second sampling rate, which is less than the first sampling rate, outside of the time period.

7. The method of claim 1, wherein a duration of the time period is based at least in part on a type of the update event.

8. A computing system having a memory having computer readable instructions and one or more processors for executing the computer readable instructions, the computer readable instructions controlling the one or more processors to perform operations comprising:

detecting an update event in a cloud computing system;

collecting, by one or more sensors, energy consumption data for the cloud computing system for a time period after an occurrence of the update event, wherein each sample collected by the one or more sensors includes a workload identifier, a pod identifier, metadata regarding software and hardware, and a current energy usage level for a portion of an identified workload being executed on an identified pod;

retraining a power consumption model with the data from the time period;

storing the power consumption model in the cloud computing system;

receiving a request for an estimated energy consumption of a workload executing on the cloud computing system, wherein the request includes an identification of the workload and a desired time period for the estimated energy consumption;

obtaining characteristics of the workload, wherein the characteristics of the workload include an identification of hardware, software and other services of the cloud computing system that are being used by the workload; and calculating an estimated energy consumption of the workload based on the characteristics of the workload and the power consumption model of the cloud computing system.

9. The computing system of claim 8, wherein the update event includes a change of one or more of a hardware device and a software within the cloud computing system.

10. The computing system of claim 8, wherein the update event includes a deviation of observed energy consumption data from an expected energy consumption data.

11. The computing system of claim 8, wherein the update event includes a deviation of observed workload activity from an expected workload activity.

12. The computing system of claim 8, wherein the energy consumption data for the cloud computing system is collected at a first sampling rate during the time period after an occurrence of the update event, wherein the update event includes a deviation of observed energy consumption data from an expected energy consumption data and/or a deviation of observed workload activity from an expected workload activity, and at a second sampling rate, which is less than the first sampling rate, outside of the time period, wherein the first sampling rate is at least twice the second sampling rate.

13. The computing system of claim 8, wherein metrics for an activity of a workload executing in the cloud computing system are collected at first sampling rate during the time period and at a second sampling rate, which is less than the first sampling rate, outside of the time period.

14. The computing system of claim 8, wherein a duration of the time period is based at least in part on a type of the update event.

15. A computer program product comprising a computer readable storage medium having program instructions embodied therewith, the program instructions executable by a processor to cause the processor to perform operations comprising:

detecting an update event in a cloud computing system;

collecting, by one or more sensors, energy consumption data for the cloud computing system for a time period after an occurrence of the update event, wherein each sample collected by the one or more sensors includes a workload identifier, a pod identifier, metadata regarding software and hardware, and a current energy usage level for a portion of an identified workload being executed on an identified pod;

retraining a power consumption model with the data from the time period;

storing the power consumption model in the cloud computing system;

receiving a request for an estimated energy consumption of a workload executing on the cloud computing system, wherein the request includes an identification of the workload and a desired time period for the estimated energy consumption;

obtaining characteristics of the workload, wherein the characteristics of the workload include an identification of hardware, software and other services of the cloud computing system that are being used by the workload; and calculating an estimated energy consumption of the workload based on the characteristics of the workload and the power consumption model of the cloud computing system.

16. The computer program product of claim 15, wherein the update event includes a change of one or more of a hardware device and a software within the cloud computing system.

17. The computer program product of claim 15, wherein the update event includes a deviation of observed energy consumption data from an expected energy consumption data.

* * * * *